United States Patent
Fumoto

[11] 4,003,082
[45] Jan. 11, 1977

[54] COLOR TELEVISION SYSTEM EMPLOYING INDEX SIGNAL GENERATING MEANS

[75] Inventor: Teruo Fumoto, Kawasaki, Japan

[73] Assignee: Matsushita Electric Industrial Company, Limited, Japan

[22] Filed: May 13, 1975

[21] Appl. No.: 577,077

[30] Foreign Application Priority Data
May 15, 1974 Japan .............................. 49-54754

[52] U.S. Cl. .............................................. 358/69
[51] Int. Cl.² ...................................... H04N 9/24
[58] Field of Search .......... 358/69, 67; 307/225 R

[56] References Cited
UNITED STATES PATENTS

| | | | |
|---|---|---|---|
| 2,945,087 | 7/1960 | Graham et al. | 358/69 |
| 3,041,392 | 6/1962 | Keiper, Jr. et al. | 358/69 |
| 3,234,324 | 2/1966 | Mutschler | 358/69 |

Primary Examiner—Benedict V. Safourek
Assistant Examiner—Mitchell Saffian
Attorney, Agent, or Firm—Robert E. Burns; Emmanuel J. Lobato; Bruce L. Adams

[57] ABSTRACT

A main index signal is generated concurrently with the excitation of a plurality of triplet groups of color generating segments by a sweeping electron beam at a frequency which is a nonintegral number multiplied by the triplet frequency, a frequency at which the triplet groups are excited per a unit time. An auxiliary index signal is generated preceding the occurrence of the main index signal. A frequency counter is provided to convert the frequency of the main index signal to the triplet frequency. The auxiliary signal is delayed, differentiated and used to reset the counter to cancel the content therein to initiate counting of the significant bits of the main index signal at the start of each of the line scansions.

6 Claims, 11 Drawing Figures

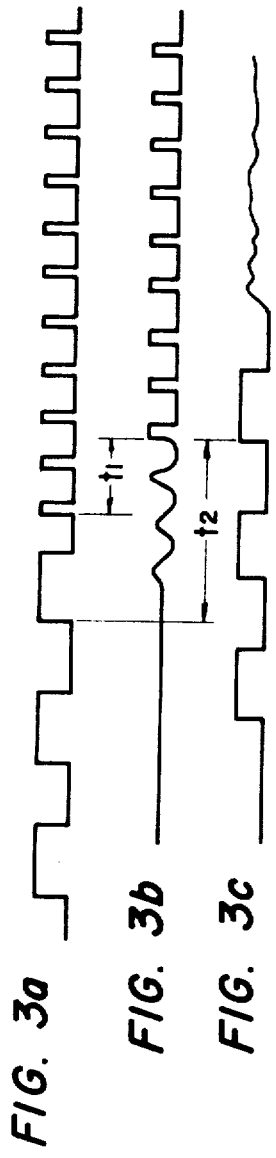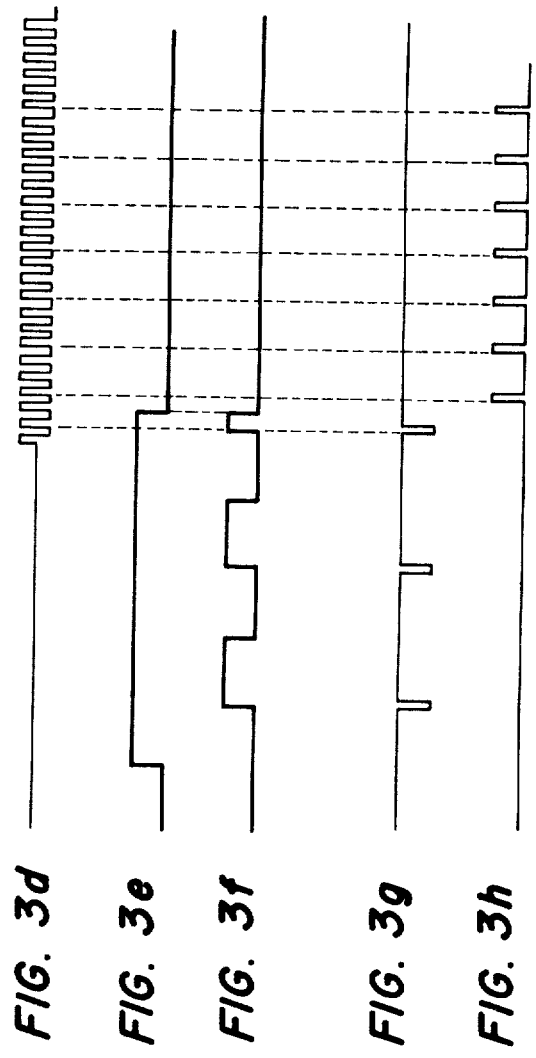

COLOR TELEVISION SYSTEM EMPLOYING INDEX SIGNAL GENERATING MEANS

The present invention relates to color television systems employing a cathode ray tube provided with index signal generating means, and more particularly to circuit arrangements for processing the index signal to provide proper color rendition.

Heretofore, indexing means have been provided in color television systems for the purpose of determining the position of the scanning beam with respect to color generating strip elements for producing desired color representations. A prior art color television system includes a cathode ray tube comprising a screen member having a plurality of color generating segments arranged in groups of color triplets occurring at a predetermined rate along a specified path, a plurality of first index elements arranged to occur at a predetermined rate along the horizontal path for sequential excitation by the beam of the cathode ray tube concurrent with the excitation of the groups of color producing segments for generating a first or main index signal, and a plurality of second index elements arranged to occur at a predetermined rate along said path preceding the first elements for sequential excitation by the cathoderay beam before excitation of the first elements for generating a second index signal.

U.S. Pat. No. 2,892,123 discloses a system in which a phasing network is provided which comprises a frequency multiplier circuit and a frequency mixing circuit energized by the first and second index signals derived from a signal detecting means. The phasing network initially receives the second index signal for determining the phase of its output signal, and thereafter is energized by the first index signal until the beam of the cathode ray tube completes the scan of line path. To provide continuous generation of the mixer output while the beam sweeps across the face plate, the mixer output is fed back to the mixing circuit through a phase-locked loop.

However, the loop circuit introduces a time delay to the signal as it recirculates through the loop. Therefore, the position of the cathode-ray beam in the color generating strip segments is displaced increasingly from the desired position as the beam traverses the index strips along the horizontal paths.

It is therefore the primary object of this invention to provide a color television system employing the index signal generating means in which misalignment of the cathode-ray beam is minimized.

Another object of the invention is to provide a new and improved index signal processing circuit for a color television system initially generating a resetting index signal and counting an ambiguous index signal derived from the main index elements and utilizing the resetting signal to start the counting operation for generating an unambiguous index signal.

A signal processing circuit of the invention which may be used with the index generating means comprises a frequency counter for converting the frequency of the first index signal to a frequency equal to or lower than the frequency at which the color generating strip elements are excited and a resetting circuit generating a reset pulse at the start of each line scan. The output signal from the counter at the frequency of the color generating elements is combined with color information signals for modifying the intensity of the cathode ray beam in the conventional manner. The output signal from the counter at a frequency lower than the frequency of the color generating elements may be mixed with the first index signal to generate a signal at the frequency of the color generating elements. To achieve proper resetting operation of the frequency counter, the first and second index signals are applied to respective bandpass amplifiers tuned to the frequencies of the applied signals. This not only separates the two signals from each other, but also imparts respective delays to them depending on the bandwidth of the bandpass amplifiers. The frequency at which the second index elements is excited is selected at a value lower than the frequency at which the first index elements is excited so that the second index signal undergoes a greater time delay than the first index signal so that it occurs immediately preceding an effective bit of the first index signal to cause the counter to initiate counting of the effective bits of the first, or main index signal.

The invention will be further described with reference to the accompanying drawings, in which:

FIG. 3a illustrates in grahic form the index signals generated as the beam of the cathode ray tube sweeps across the index elements of FIG. 2;

FIG. 3b illustrates in graphic form a main index signal appearing at the output of a bandpass amplifier used in the circuit of FIG. 1;

FIG. 3c illustrates in graphic form an auxiliary index signal appearing at the output of another bandpass filter used in the circuit of FIG. 1;

FIG. 3d illustrates in graphic form the signal output of a frequency doubling circuit of the circuit of FIG. 1;

FIG. 3e illustrates in graphic form a gating pulse used to eliminate noise contained in the auxiliary index signal;

FIG. 3f illustrates in graphic form a gated auxiliary signal;

FIG. 3g illustrates in graphic form differentiated pulses derived from differentiation of the gated auxiliary signal;

FIG. 3h illustrates in graphic form the output signal from a frequency counter used in the circuit of FIG. 1.

Figure 1:
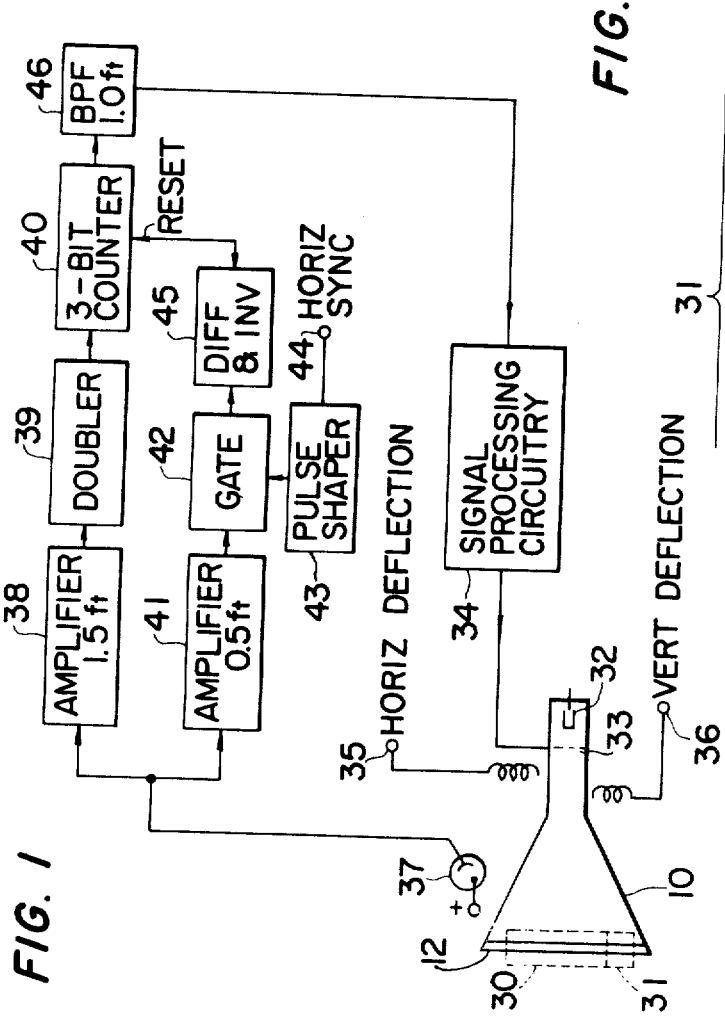
FIG. 1 is a preferred embodiment of the invention in a functional block diagram.
Figure 2:
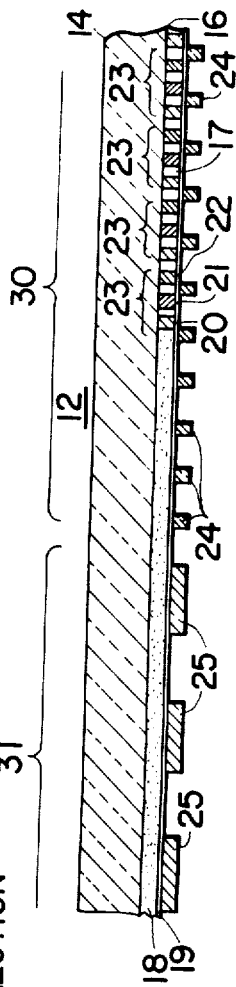
FIG. 2 is an enlarged view in cross-section of a portion of the screen of a cathode ray tube used in the present invention.

Referring now to FIGS. 1 to 4 inclusive for description of the circuitry of the invention, a cathode ray tube 10 is provided with a glass face or viewing screen member 12 having an outer viewing surface 14 and an inner surface 16 (FIG. 2). The inner surface 18 of the screen member 12 of the cathode ray tube 10 is provided with a plurality of parallel horizontally displaced vertical strip segments 20, 21 and 22. The strip segments 20, 21 and 22 are arranged in sequence so that each serial arrangement of segments 20, 21, and 22 forms one of a plurality of triplet groups 23.

The segments 20, 21 and 22 when impinged by a cathode-ray beam each produces a light of different color. For instance, the segment 20 may be made of a phosphor which produces blue light, while segment 21 is made of a phosphor generating green light, and segment 22 is composed of a phosphor emitting red light. The segments 20, 21 and 22 are positioned across the screen member 12 so that a cathode ray beam sweeping horizontally across the screen member 12 will traverses a multitude of such triplet groups for each line scan.

The segments 20, 21, and 22 are disposed in alternate relation with a strip 17 of carbon graphite. On the marginal portion of the screen member 12, the carbon graphite extends in the form of a continuous layer 18. An aluminum layer 19 is provided over the segments 20, 21 and 22 and carbon graphite strips 17 and layer 18. The coating 19 will not interfere with the impingement of electrons upon the segments of the groups 23, while reflecting the light produced by the segments of the triplet groups 23 towards the outer surface 14 of the screen member 12.

A plurality of index elements 24 are provided over the inwardly facing surface of the aluminum layer 19. The index elements 24 are equally spaced vertical strips which are horizontally spaced or displaced across the surface of the aluminum layer 19. The index elements 24 may be made of a phosphor of short persistence or of a material having a secondary emission different from the secondary emission of the aluminum layer 19.

The triplet groups 23 of the segments 20, 21, 22 occur at a constant rate along a substantially horizontal line or path traversing the groups 23, and the index elements 24 also occur at a predetermined constant rate along such a path. The relationship of the rates of occurrence of the groups 23 and the rate of occurrence of the index elements 24 along said path is fully described in the aforementioned United States patent. As described in this patent, where the segments are positioned with one of the index elements 24 over each of the respective segments 20, 21, 22 of the triplet groups 23, a shift in phase of the index signal occurs with the variation of the color rendered, and this undesirable phase shift is substantially reduced and practically eliminated by the occurrence of the index elements 24 along said path at a rate which is the product of a nonintegral number greater than unity multiplied by the rate of the triplet groups 23 along said path. Thus, the rate of the index elements 24 may, for example, be substantially 1½, 2½, 3½, 4½, 5½ and so forth times the rate of the triplet groups 23. In the illustration of FIG. 2, the rate of the segments 24 is one and a half times the rate of the triplet groups 23 along a horizontal path traversing the groups. Therefore, 3 index elements 24 occur for each set of 6 segments 20, 21, 22. The segments 20, 21, 22 and the index elements 24 are disposed to cover the substantial portion of the screen area designated by numeral 30 which adjoins a marginal portion 31 positioned to the left of the screen portion 12. A portion of the area 30 adjacent to the marginal area 31 may not be provided with the light emitting segments 20, 21, 22 if it lies outside of the viewing area of the screen, but must be provided with the index elements 24 in continuation with a plurality of second index elements 25 of similar construction to the first index elements 24. The second index elements 25 preferably comprise vertical strips of a greater width than the width of the first index element 24 and are arranged to occur at the rate lower than the rate at which the first index elements occur along the horizontal path traversing the elements 24. In the construction of the cathode ray tube 10, the second index elements 25 occur at a rate 0.5 times the rate at which the segments 20, 21, 22 occur along the horizontal path.

The index signals produced by the impingement of the cathode ray beam as it sweeps to the right along its horizontal path across the screen member 12 are shown in FIG. 3. In accordance with the invention, the second index elements 25 are used to generate a signal to reset a counter which will be described later.

In FIG. 1, the color television system comprises the cathode ray tube 10 having its viewing screen member 12 provided with the main index portion 30 and the auxiliary or resetting index portion 31 within dashed lines. The cathode ray tube 10 is provided with means for producing a cathode-ray beam including a cathode 32. A control electrode 33 is adapted to receive the signal from a signal processing circuit 34 for varying the intensity of the cathode ray beam produced. The cathode ray tube 10 is provided with beam deflecting means such as horizontal deflection and vertical deflection magnetic coils which are respectively energized by signals delivered to their terminals 35 and 36. The beam may be caused to move from left to right at a substantially constant speed. At the beginning of each horizontal path, the beam impinges upon the auxiliary index elements 25, and after further travel along the path, it impinges upon the segments of the triplet groups 23 and the main index elements 24. In the construction of the cathode ray tube 10, the auxiliary index elements 25 are preferably confined to a marginal region on the extreme left of the screen member 12. This area is sufficiently narrow so that it does not substantially reduce the viewing area of the cathode ray tube 10, while it is sufficiently wide to provide a series of resetting pulses which will be described.

A photoelectric cell 37 is positioned outside of the cathode ray tube 10 and is energized by the light produced by the index elements 24 and 25 as they are excited by the impinging cathode ray beam. The signal from the photoelectric cell 37 is applied to a bandpass filter or amplifier 38 which is tuned to a frequency one and a half times the triplet frequency. The triplet frequency is defined as the number of triplet groups 23 impinged by the cathode ray beam in its travel along the horizontal paths traversing the groups per unit time. The signal from the amplifier 38 is delivered to a frequency doubling circuit 39. The frequency doubler circuit 39 delivers its output signal at a frequency which is three times the triplet frequency ($f_t$) to a 3-bit counter 40 (FIG. 3d). The counter 40 demultiplies the frequency by a factor of three so that the input frequency is converted to the triplet frequency. The signal from the photocell 37 is concurrently applied to a bandpass amplifier 41 tuned to a frequency which is 0.5 times the triplet frequency. Therefore, the output signal from the photocell 37 which may be in the form as shown in FIG. 3a is applied to the respective bandpass amplifiers 38 and 41 so that the signals from the main index elements 24 and the auxiliary index elements 25 are separated from each other. As is well known in the art, the signal undergoes a delay as it passes through a bandpass filter depending on the bandwidth of the passing filters. The signal at the output of amplifier 38 is delayed by period $t_1$ as illustrated in FIG. 3b, while the output signal of amplifier 41 is delayed by period $t_2$ which is greater than $t_1$ as shown in FIG. 3c. If the frequency of each amplifier is so selected that the two signals appear substantially at the same time, the signal from the amplifier 41 can be utilized to cause the counter 40 to initiate its counting operation. Actually, the signal from the photocell 37 is contaminated with spurious noise generated as the cathode-ray beam sweeps across the index elements 24 and 25 (see FIGS. 3b and 3c) and the signal from the amplifier 41 is preferably delayed such that it occurs immediately preceding a pulse generated from the first one of the main index elements 24. Furthermore, because of the noise generated by the beam scan, the content of the 3-bit counter 40 at the end of each scansion along each horizontal path will become ambiguous. It will be appreciated that the signal from amplifier 41 can thus be utilized to cancel the content of the counter 40.

For resetting purposes, the resetting signal from the amplifier 41 should be free from the noise as described above. In order to eliminate the noise from the resetting signal, horizontal synchronizing pulses from terminal 44 is received by a pulse shaper 43 to form a gate pulse (FIG. 3e) which is applied to a gate 42 to extract the desired portion of the reset signal. The gated reset pulses (FIG. 3f) are differentiated and their polarity inverted by a circuit 45 and applied to the reset terminal of the 3-bit counter 40.

The signal from the counter 40 (FIG. 3h) is delivered to a bandpass filter 46 tuned to the triplet frequency and applied to the signal processing circuit 34 which processes the signal in a manner similar to that described in U.S. Pat. No. 2,892,123, the output signal therefrom being applied to the control electrode of the cathode ray tube 10 for varying the intensity of the cathode-ray beam.

Figure 4:
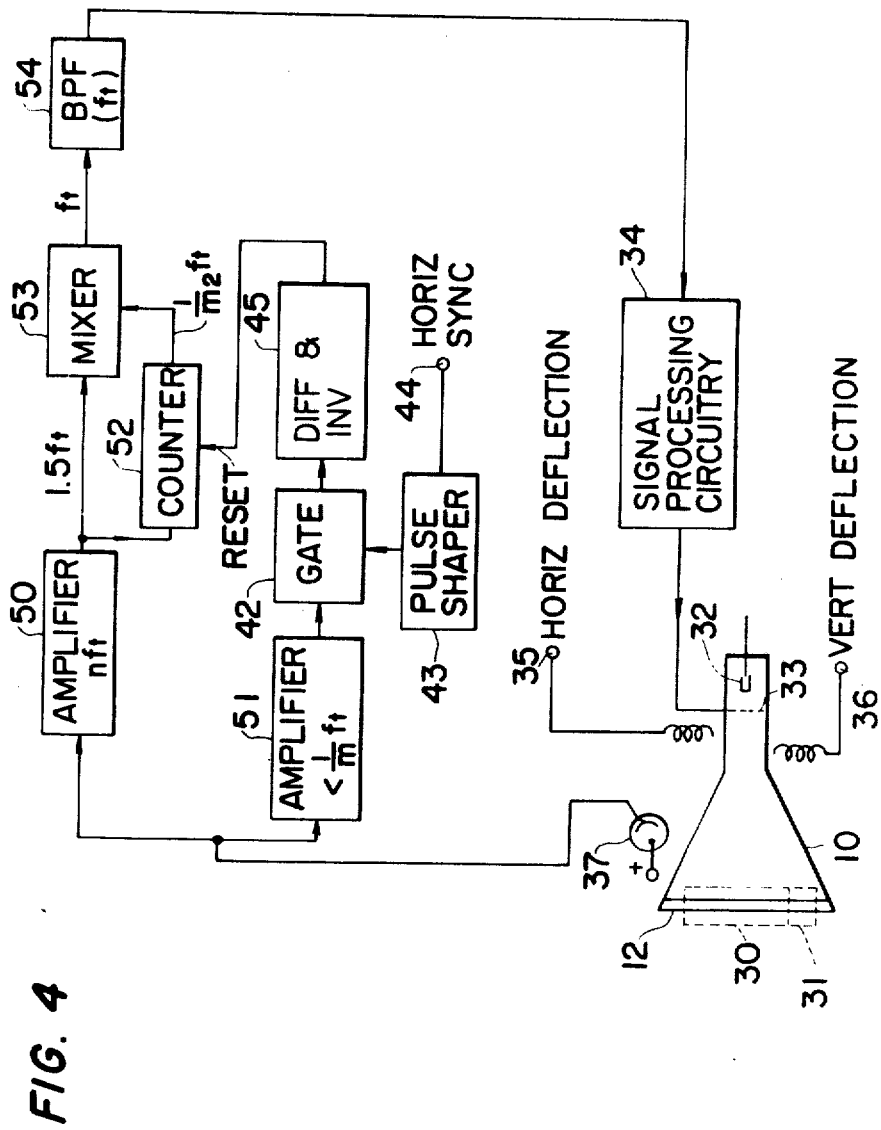
FIG. 4 is a variation of the present invention.

FIG. 4 shows a variation of the invention in which similar parts are indicated at identical numbers. In this embodiment, the main index elements 24 are arranged to occur at a frequency which is the product of a nonintegral number n multiplied by the triplet frequency, while the auxiliary index elements 25 are arranged to occur at a frequency which is the product of $1/m_1$ multiplied by the triplet frequency, where $m_1$ is an integer. The output signal from the photocell 37 is applied to an amplifier 50 which is tuned to the frequency of the main index elements 24 and to an amplifier 51 which is tuned to the frequency of the auxiliary index elements 25. A counter 52 is provided which demultiplies the input frequency by a factor of $1/n \times 1/m_2$, where $m_2$ is an integral number, so that the output frequency is $ft/m_2$.

Assume that n equals to 1.5 and $m_2$ being two, the input frequency of 1.5 $f_t$ is demultiplied by a factor of $1/1.5 \times \frac{1}{2}$ and the output frequency is thus 0.5 $f_t$. The output signal from the counter 52 is applied to a mixing circuit 53 to which is also applied the output signal from amplifier 50. The mixing circuit 53 may be a double balanced modulator in which after modulation takes place the output signal contains the two side bands. The lower side band appearing at the output of the bandpass filter 54 is a signal at the triplet frequency. The counter 52 is reset by the signal from the differentiator inverter 45 in a similar manner to that previously described.

It will be appreciated that the frequency at which the main index elements 24 are excited is converted to the frequency at which the triplet groups of light emitting segments 20, 21, 22 are excited by the use of a frequency counter, and the content of the counter is cancelled each time when the cathode-ray beam impinges on a specified element of the main index elements 24, or a position immediately preceding the first of the series of index elements 24.

This arrangement ensures that the cathode-ray beam, when under the control of the index signal so derived, impinges on the correct position of the light emitting segments as it sweeps across the screen.

The foregoing description shows only preferred embodiments of the present invention. Various modifications are apparent to those skilled in the art without departing from the scope of the present invention. For example, the auxiliary or resetting index elements may be constructed as having at least one strip element which is electrically separately connected to external circuitry from the main index elements 24. Therefore, the embodiments shown and described are only illustrative not restrictive.

What is claimed is:

1. In a color television system including a cathode ray tube comprising a screen member having a plurality of parallel laterally disposed vertical strip segments each producing light of one of three primary colors when excited, arranged in sequence according to color generated, and forming substantially identical triplet groups occurring at a predetermined rate along substantially horizontal paths of excitation traversing said segments; and means providing a cathode-ray beam for scanning said screen member and sequentially exciting said groups of segments along said paths, said screen member being provided with a plurality of first index strip elements arranged parallel with said strip segments for sequential excitation by said beam concurrent with the excitation of said triplet groups; said screen member being provided with a plurality of second index strip elements occurring at a predetermined rate along said paths preceding said first elements for sequential excitation by said beam before excitation of said first elements, the rate of said second elements along said paths being different from the rate of said first elements along said paths; first bandpass filter means tuned to the frequency of, and receptive of, the signal from said first elements for filtering the same; second bandpass filter means tuned to the frequency of, and receptive of, the signal from said second elements for filtering the same, and a gate circuit coupled to the second bandpass filter means for gating the output signal from said second bandpass filter means, the improvement comprising: counting means coupled to said first filter means for converting the frequency of the signal therefrom to the frequency of said triplet groups; means for enabling the gate circuit at the start of each scan along said path, and means for coupling the output of the gate circuit to said counting means for resetting said counting means at the start of each scan to erase the contents thereof.

2. A color television system as claimed in claim 1, further comprising means for differentiating the gated output signal from the gate circuit and for applying the differentiated gate output signal to reset said counting means.

3. A color television system as claimed in claim 1, wherein each of the bandwidths of said first and second filter means is selected such that the respective signals passing through said filter means undergo delays so that the delayed output signals from the first and second filter means occur substantially at the same time.

4. In a color television system including a cathode ray tube comprising a screen member having a plurality of parallel laterally disposed vertical strip segments each producing light of one of three primary colors when excited, arranged in sequence according to color generated, and forming substantially identical triplet groups occurring at a predetermined rate along substantially horizontal paths of excitation traversing said segments; and means providing a cathode-ray beam for scanning said screen member and sequentially exciting said groups of segments along said paths, said screen member being provided with a plurality of first index strip elements arranged parallel with said strip segments for sequential excitation by said beam concurrent with the excitation of said groups at a frequency which is the product of a nonintegral number multiplied by the frequency at which said groups are excited by said cathode-ray beam, said screen member being provided with a plurality of second index strip elements occurring at a predetermined rate along said paths preceding said first elements for sequential excitation by said beam before excitation of said first elements, the rate of said second elements along said paths being $1/m_1$ times the rate of said first elements along said paths, where $m_1$ is an integral number; first bandpass filter means tuned to the frequency of, and receptive of, the signal from said first elements for filtering the same; second bandpass filter means tuned to the frequency of, and receptive of, the signal from said second elements for filtering the same, and a gate circuit connected to the second bandpass filter means for gating the output signal from said second bandpass filter means, the improvement comprising: a pulse counter coupled to said first bandpass filter means for the frequency dividing the signal from said first elements by a factor of $n \times m_2$, where $m_2$ is an integral number and n is said nonintegral number; a mixer for providing a beat frequency of the signals from said first bandpass filter means and said counting means, wherein said beat frequency is equal to the frequency at which said triplet groups are excited, means for enabling the gate circuit at the start of each scan along said path, and means for coupling the output of the gate circuit to said counting means for resetting said counting means at the start of each scan to erase the contents thereof.

5. A color television system as claimed in claim 4, further comprising means for differentiating the gated output signal from the gate circuit and for applying the differentiated gate output signal to reset said counting means.

6. A color television system as claimed in claim 4, wherein each of the bandwidths of said first and second filter means is selected such that the respective signals passing through said filter means undergo delays so that the delayed output signals from the first and second filter means occur substantially at the same time.

* * * * *